Aug. 24, 1965   R. J. WELDON   3,202,129
POINTER AND SCALE ARRANGEMENT
Filed Nov. 13, 1962   6 Sheets-Sheet 1

INVENTOR
ROGER J. WELDON

BY *Fisher Christen & Godson*
ATTORNEYS

FIG.3

Aug. 24, 1965 R. J. WELDON 3,202,129
POINTER AND SCALE ARRANGEMENT
Filed Nov. 13, 1962 6 Sheets-Sheet 3

INVENTOR
ROGER J. WELDON

BY
ATTORNEYS

Aug. 24, 1965  R. J. WELDON  3,202,129
POINTER AND SCALE ARRANGEMENT
Filed Nov. 13, 1962  6 Sheets-Sheet 4

INVENTOR
ROGER J. WELDON

BY
ATTORNEYS

Aug. 24, 1965

R. J. WELDON 3,202,129

POINTER AND SCALE ARRANGEMENT

Filed Nov. 13, 1962

INVENTOR
ROGER J. WELDON

BY
ATTORNEYS

Aug. 24, 1965  R. J. WELDON  3,202,129
POINTER AND SCALE ARRANGEMENT
Filed Nov. 13, 1962  6 Sheets-Sheet 6
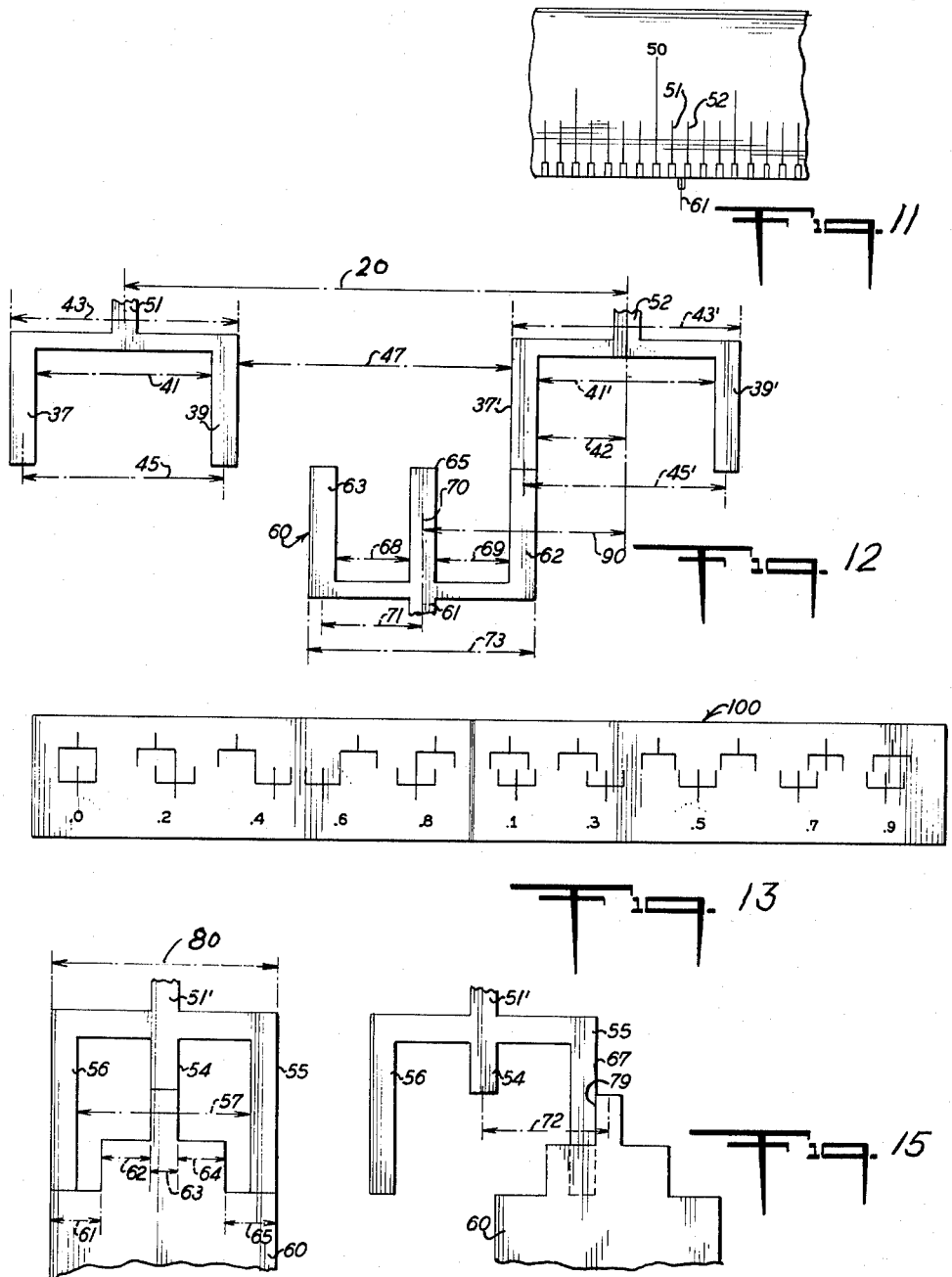
INVENTOR
Roger J. Weldon
BY Fisher, Christen, Sabol + Caldwell
ATTORNEYS United States Patent Office 3,202,129
Patented Aug. 24, 1965

3,202,129
POINTER AND SCALE ARRANGEMENT
Roger J. Weldon, 6025 San Leandro, Tucson, Ariz.
Filed Nov. 13, 1962, Ser. No. 236,960
9 Claims. (Cl. 116—135)

This is a continuation-in-part of my prior co-pending application Serial No. 762,158, filed September 19, 1958, now abandoned.

This invention relates to a pointer and scale arrangement and more particularly to such an arrangement whereby accurate readings and settings may be readily made instead of the interpolated readings required on the usual pointer and scale arrangement.

The usual pointer and scale arrangement requires an operator to estimate the relative distances of the pointer from two scale marks, which estimation is called interpolation. Studies have shown that individuals vary considerably in their accuracy of interpolation. Therefore, an objective of this invention is to substantially eliminate such errors by providing the operator with a novel visual configuration to enable him to make accurate readings or settings within the scale interval.

There are other pointer and scale arrangements that provide an increase in accuracy over the usual scale. The most common of these arrangements is the introduction of as many fine lines within the scale interval as there are fractional units to be read. Thus, for example, instead of interpolating to tenths of a scale interval, nine fine lines can be put into the scale interval and the pointer position read to the nearest line. This kind of arrangement is found on drafting scales, but is not recommended for many pointer and scale arrangements because the closely placed lines are confusing to many operators, and unless the pointer is extremely thin it stands in the way of reading the fine lines.

Another well known pointer and scale arrangement for increasing accuracy is the well known vernier scale. In this system the moving pointer carries an extension in the direction of pointer movement. This surface is marked with a number of scale marks. The scale marks are spaced either a little more or a little less further apart than the marks of the scale. Such an arrangement is often found on surveying and scientific instruments but is not suitable for application on a freely moving and sensitive pointer because of its size and weight. However, because of the need for the great accuracy required in some instances, optical verniers are placed on very sensitive balances at considerable cost.

A third pointer and scale arrangement for providing accuracy is that of running diagonal lines below the scale line, which diagonal lines cross other lines concentric to the scale line. This arrangement is found on instrument dials which have freely moving and sensitive pointers. They are serviceable but also have serious disadvantages. Such arrangements take up space and unless considerable space is used are not accurate.

It is an object of this invention to contribute a device which is attractive, is not confusing, takes up no more space than the usual scale, and at the same time provides an increase in accuracy. The increased accuracy is obtained by the addition of one or two small lines within the space of the usual scale interval and the addition does not add appreciably to the cost of the instrument.

Another object of this invention is to permit the use of a pointer and scale arrangement of smaller size than that of the usual scale and yet retain the same level of accuracy of the larger scale. This is made possible by the increase of accuracy per unit of space over that of other arrangements known to the art. This is of considerable advantage in applications in which space must be conserved. Although the pointer and scale arrangement of this invention can be thought of either as providing more accuracy in the same scale space than the usual scale, or as providing the same accuracy in less space, it will be described only in the sense of providing greater accuracy.

A further object of this invention is to provide a device having the scale marks, and the pointer or indicator, comprising a plurality of tines and assigning precise widths to the tines and precise distances between the tines. This, in turn, will produce a visual representation of the position of the pointer with respect to the scale which will better utilize visual acuity in the determination of the correct fractional reading for the pointer, in place of the ordinary visual interpolation utilized in the common pointer and scale arrangement.

In general terms the invention achieves the above stated objectives by greater utilization of the information available from the edges, dimensions, and configurations of the pointer and scale marks and by the consequent reduction in the number of scale marks required for precise reading.

Other objects and advantages of the invention will be readily apparent as the description proceeds, reference being had to the accompanying drawings in connection with the detailed description appearing hereinafter. It will be understood, of course, that the drawings and description deal with what is now regarded as preferred embodiments of the invention. However, it will be obvious that various changes and modifications may be made in the invention, as disclosed herein, without departing from the spirit and scope of the subject matter hereinafter claimed.

In the drawings:

FIGURE 3 is a view of a set of ten single scale intervals, with a pointer in each, similar to those in FIG. 2 but greatly enlarged to show in detail an example of the configurations used in this invention;

FIGURE 11 is a view of a portion of a further modification of the scale and a pointer arrangement embodying this invention with a scale reading of 51.6;

FIGURE 12 is a view similar to FIGURE 11 but on an enlarged scale with a scale reading of 51.6;

FIGURE 13 is a view of a series of schematic representations showing the modified pointer and scale of FIGURE 11 in various positions with respect to each other.

FIGURE 14 is a view of a further embodiment of the invention utilizing a pyramidal pointer and having a scale reading of 51.0; and FIGURE 15 is a view of the structure of FIG. 5 having a reading of 51.25.

I have set forth the invention in terms of four principles. In order to accurately describe these principles the definitions of several phrases as used herein are specified.

*Scale mark* is used to denote any mark on the scale which assists in determining the scale values of pointer positions.

*Scale interval* is used to denote the basic marked interval of a scale. It is the smallest repeating pattern on a scale of equal intervals. For example, there are ten scale intervals between 15 and 25 in FIGURE 1 and in FIGURE 2.

*Interval mark* is used to denote a scale mark at the boundary of the scale interval, for example, B in several of the figures.

*Sub mark* is used to denote a scale mark wholly within a scale interval, for example, C in several figures.

*Smallest fractional* unit is used to denote the smallest unit of value to which a pointer and scale arrangement is designed to be read, or to which it is commonly read.

Figure 1:
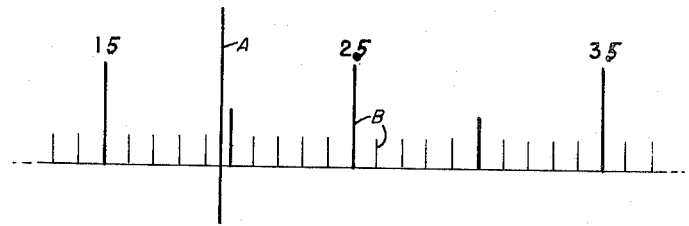
FIGURE 1 is a partial view of a prior art pointer and scale arrangement.

*Final decimal* is used to denote the smallest fractional unit when a scale is read uniformly to some decimal place. In FIGURE 1, for example, the reading is 19.7 and the final decimal is .7.

*Unit point* is used to denote the precise point on the scale at which a specified part of the pointer stands when it indicates a smallest fractional unit exactly. For example, in FIGURE 1 a pointer exactly covering the interval mark at 15.0 would be at a unit point. Unit points are at 15.1, 15.2, etc.

*Boundary point* is used to denote a point on the scale midway between two unit points. For example, on a scale to be read to one decimal, boundary points are at 15.05, 15.15, 15.25, etc.

*Fractional interval* is used to denote the distance between two adjacent unit points or two adjacent boundary points. It is a single, standard distance on a scale of equal intervals.

Referring now to the drawings wherein like numerals indicate like elements, FIGURE 1 shows a conventional pointer and scale arrangement with equally spaced interval marks B. The pointer A can be a sliding pointer; it may turn on a pivot at its lower or its upper end; it may be a moving line of light; it may be stationary with the scale turning or sliding with respect thereto; or it may be any suitable arrangement to permit relative movement of the pointer to the scale. The scale base line may be straight as in FIGURE 1, or an arc of any suitable radius. The length of the various scale marks can vary within the limits set by clarity, custom within the art, and space.

There are other features such as the width of the interval marks B, and the width of the pointer A, which can be varied in the conventional scale without serious consequences but which are of critical importance in the instant invention. My invention has to do with smallest fractional units, unit points, and fractional intervals within the scale interval, and not with the more general characteristics of the usual pointer and scale arrangement which remain approximately unchanged.

Figure 2:
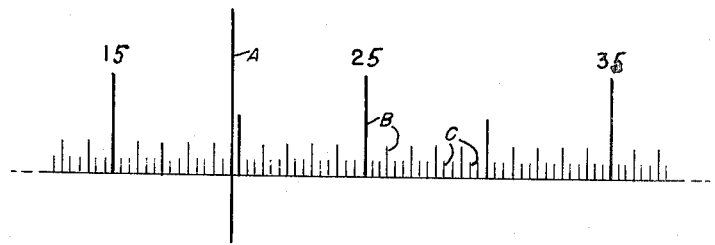
FIGURE 2 is a partial view of a selected embodiment of the pointer and scale arrangement of this invention.

As can be readily seen, the general configurations of FIGURES 1 and 2 are quite similar. This is advantageous since an operator can easily become familiar with the described system because of his general background knowledge of the most conventional systems.

Figure 3:
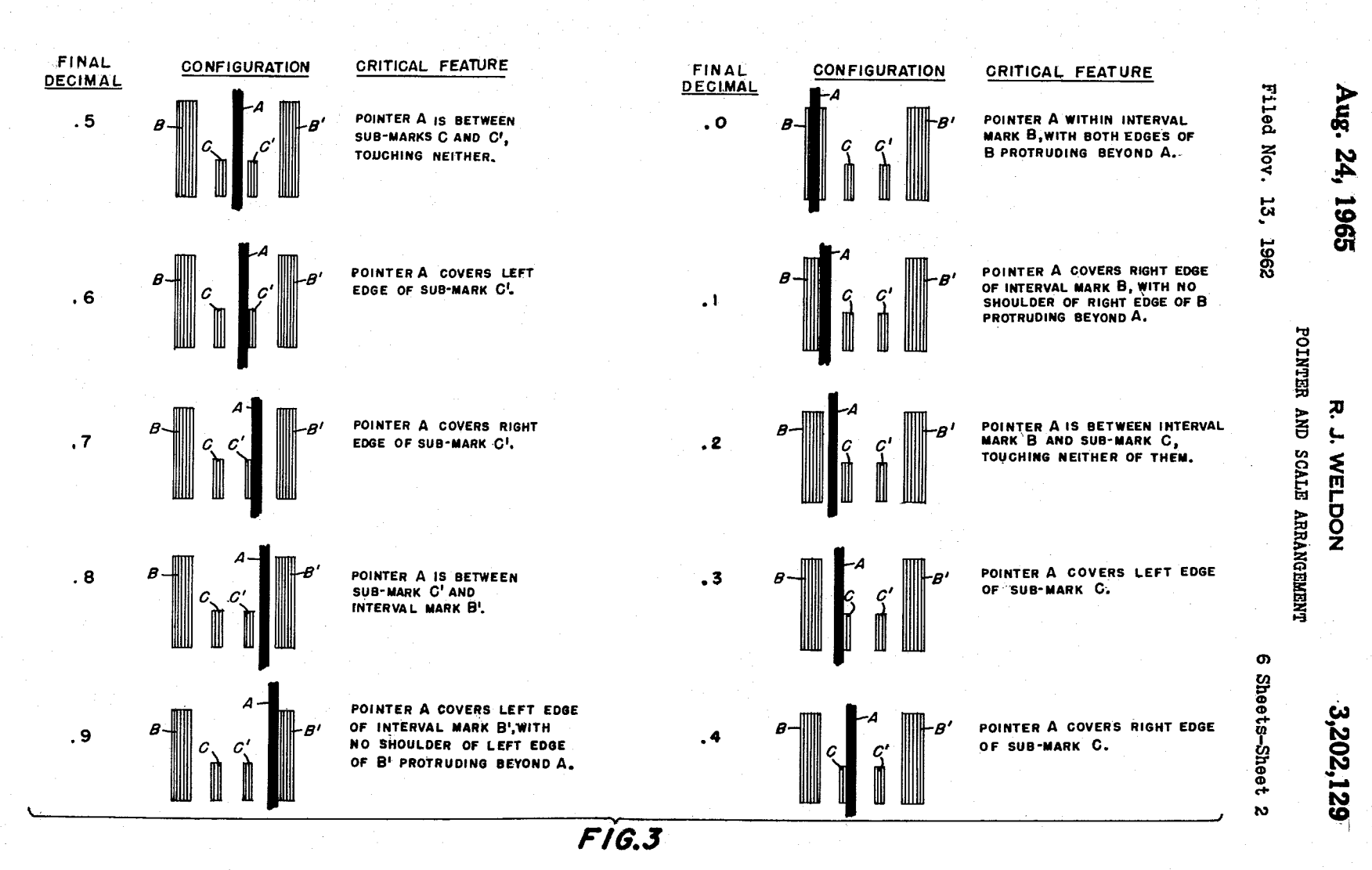

In FIGURE 3 a scale interval of the embodiment shown in FIGURE 2 is enlarged and repeated ten times with the pointer position changed, to show the ten possible pointer and scale mark configurations within the scale interval. These configurations are shown completely in order to trace through what the operator has to know and do to read the scale correctly.

Each of the interval marks B, B', C and C', is lined for ease of description. In actual practice, the interval marks most probably would be of a solid color.

Figure 8:
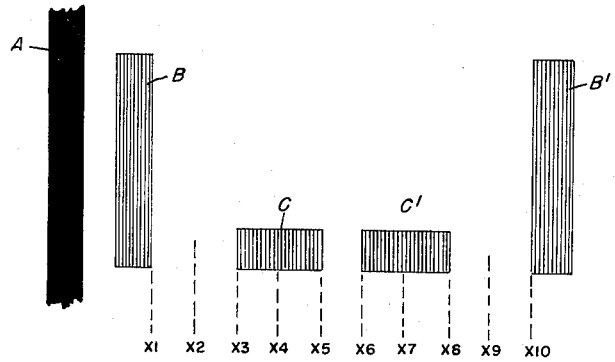
FIGURES 8, 9 and 10 are views of of selected alternative embodiments of the invention.
Figure 9:
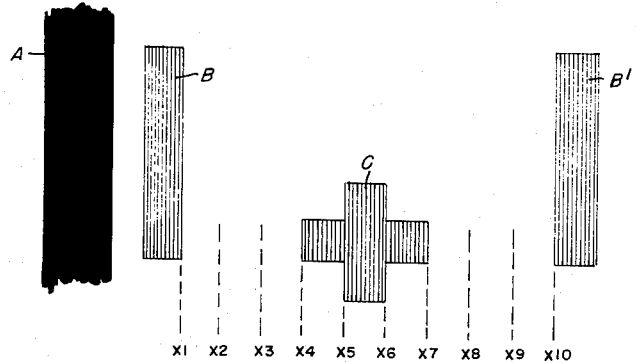
Figure 10:
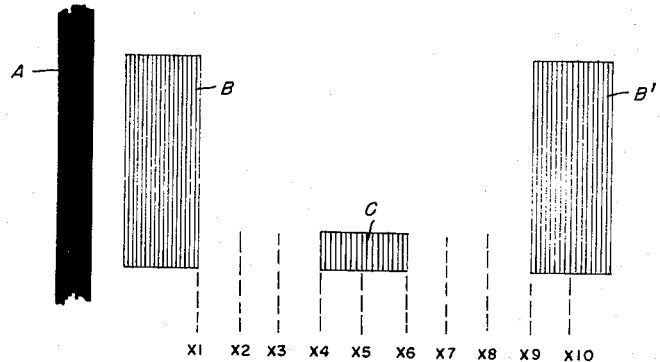

The course of the pointer through the scale interval can be similarly traced in the other embodiments illustrated in FIGURES 8, 9 and 10. Similarly, by proper proportioning any reasonable number of equal fractions within a scale interval, say from three to twenty-five, can be each represented by a distinguishable pointer and scale mark configuration.

FIGURE 3 also contains the correct final decimal to be associated with each configuration, and a statement of the critical distinguishing feature. These are self-explanatory and are not repeated here. It can be noted that there are essentially only three basic configurations, those at .0, .1, and .2, which are repeated and which can be easily memorized. The operator's task is quite simple; namely, to identify the visual configurations and to associate them with the correct final decimal.

Figure 4:
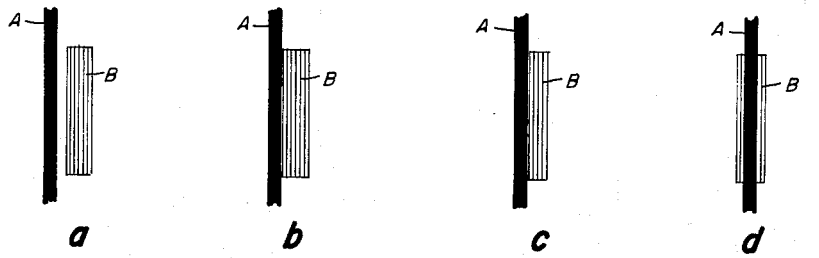
FIGURE 4 is a view of a set of four pointer and scale mark combinations which illustrate principle 1.

FIGURE 4 illustrates principle 1. Although this principle is not novel, it is illustrated because it is not commonly used. Principle 1 states that the coincidence of an edge of a movable pointer with the edge of a scale mark provides a precisely determinable pointer position. Referring to FIGURE 4, it is clear that in 4a the edges of the pointer, A, and scale mark, B, are not in coincidence. In 4b the edges are shown in coincidence and in 4c the pointer has passed to the right of coincidence. There may appear to be some lack of precision in distinguishing between the coincidence of 4b and the lack of coincidence of 4c. In practice there are two ways to make the distinction precise. The first is to take advantage of the reading parallax found in most instruments by moving the head slightly to the right; if there is a coincidence of edges a small separation will appear between the pointer and the scale mark as the position of the eye is changed. The second is to compare the width of the exposed top of the scale mark, B, to another unencumbered scale mark of the same width, say B in 4a, and if they are equal there is a coincidence. In 4d there is no coincidence because the shoulders of B protrude beyond the edge of A. However, if the pointer A were to move rightward to coincidence, ambiguity may again seem to exist. Again a parallax test will resolve the ambiguity.

Figure 5:
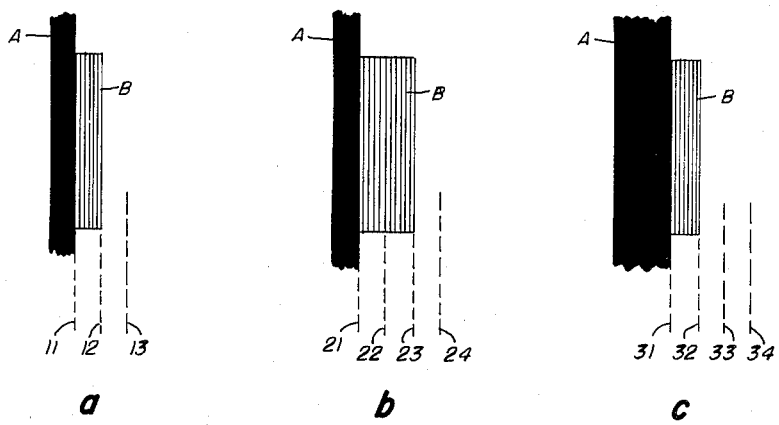
FIGURE 5 is a view of a set of three pointer and scale mark combinations which illustrate principle 2.

FIGURE 5 illustrates principle 2. Principle 2 states that if the widths of a pointer and a scale mark are properly related to each other there will be either three or four equally spaced coincidences of edges for each single scale mark. Referring to FIGURE 5a, the pointer, A, and the scale mark, B, are of equal width. The pointer, A, is shown at the leftmost coincidence which is indicated by 11 at the position of the right edge of A. It will be seen that there are two more possible coincidences as the pointer moves to the right. These coincidences are indicated by the numerals 12 and 13, and are at the points of coincidence of the right edge of A.

In FIGURE 5b the ratio of widths of pointer to scale mark is 1 to 2, which ratio provides four possible equally spaced coincidences of edges, indicated by 21, 22, 23 and 24. In FIGURE 5c the ratio of widths of pointer to scale mark is 2 to 1 and this ratio also provides four possible equally spaced coincidences of edges as indicated by the numerals 31, 32, 33, and 34.

Pointer and scale arrangements are known in which there are series of equally spaced wide lines, rectangles, or squares which are used as scale marks and for which the widths are specified. For instance, the Reiss German patent (510,620 issued in 1931) shows a series of squares along a scale. However, the width of the pointer is not related to the width of the scale marks.

Figure 6:
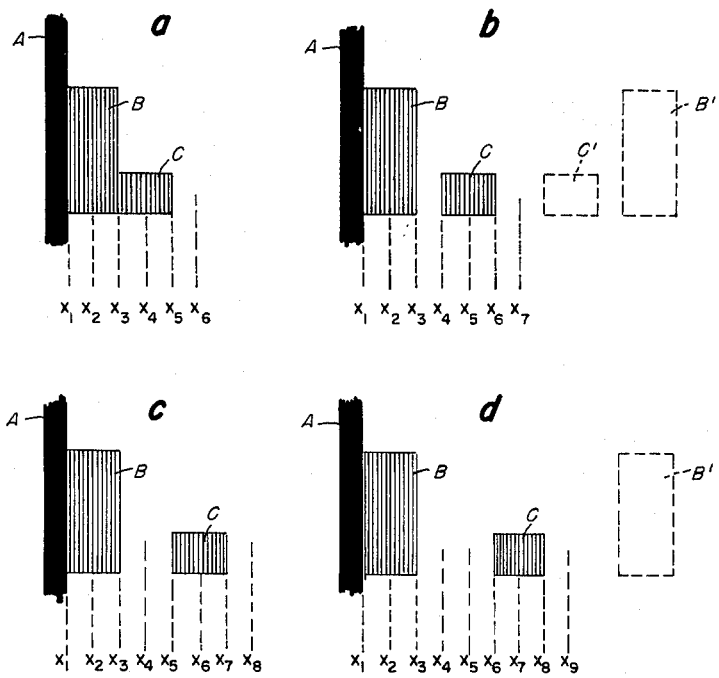
FIGURE 6 is a view of a set of four pointer and scale mark combinations which illustrate principle 3.

FIGURE 6 illustrates principle 3. This principle gives the number of pointer positions obtained by placing more than one scale mark along a scale line. Principle 3 states that if a scale mark is added to a group of existing scale marks (or to one scale mark alone) the number of equally spaced and precisely determinable pointer positions of the new and larger group is given by the formula:

$$n_T = n_B + n_C + (S-P-1) \quad (1)$$

in which:

$n_T$ = the total number of pointer positions of the new group,
$n_B$ = the number of pointer positions of the former group before the new scale mark is added,
$n_C$ = the number of pointer positions obtainable from the cooperation of the pointer and the new scale mark alone, as given by principle 2,
$P$ = the width of the pointer in fractional intervals, and
$S$ = the separation of the new scale mark from the adjacent scale mark of the former group, in terms of fractional intervals.

This formula is applicable to all combinations of pointer widths and separations. A special and important case is that in which the former group is one scale mark. In this case $n_B$ becomes the number of pointer positions obtainable by the cooperation of the pointer and that scale mark alone as given by principle 2. The formula also says that if the pointer is one fractional interval wide, and if separations are two fractional intervals, the number of pointer positions obtainable from the scale marks singly can be added, for in that case $(S-P-1)=0$. This is also true if the pointer is two fractional intervals wide and the separations are three.

Referring to FIGURE 6a the pointer, A, is one fractional interval wide, the two scale marks, B and C, are both two fractional intervals wide, and the separation between the two scale marks is zero. Principle 2 tells us that the cooperation of A with B will provide four equally spaced and precisely determinable pointer positions; and similarly of A with C. Putting these values into the Formula 1 the total number of pointer positions is:

$$n_T = n_B + n_C + (S-P-1) = 4+4+(0-1-1) = 6$$

FIGURE 6a shows the six positions with $x_1 \ldots x_6$ indicating the positions of the right edge of the pointer. Similar computations give seven positions for the arrangement in FIGURE 6b, eight positions in FIGURE 6c, and nine positions in FIGURE 6d. It will be noted that as the separation, S, increases in steps of one fractional interval, the total equally spaced pointer positions also increases in steps of one.

In FIGURE 6d there is one position, $x_5$, at which there is no coincidence of edges. If we were to hold fast to the use of principle 1 we would not use a separation of this size. However, there is considerable gain in its use, because it enables a scale interval containing ten pointer positions to be designed with only one sub mark. [This is shown in the embodiment of FIGURE 10.] The interpolation required is accurately and easily made because the only determination necessary is to decide which of two adjacent scale marks the pointer is nearer.

The main function of principle 3 is to be a guide in the design of scale intervals which will include a specified number of pointer positions, usually ten, and which scale intervals will be repeated along the scale. If a scale interval is constructed by first placing the interval mark, B, and then adding sub marks, C, C', and C'', as necessary, the final number of positions in the scale interval is not obtained solely from Formula 1. To those computations must be added the expression $(S_F - P - 1)$ in which $S_F$ is the separation between the final sub mark within the scale interval and the beginning interval mark of the next scale interval. For example, it might be thought that by adding another scale mark, C', in FIGURE 6b separated from C and B' by one fractional interval a scale interval of 10 equally spaced pointer positions would be obtained. But to complete the scale interval the effect of the final separation between C' and B' must be added. This is $$(S_F - P - 1) = (1-1-1) = -1$$

Thus the scale interval constructed as above will have only nine equally spaced pointer positions. To correct for this one of the two separations of C' would have to be increased to two fractional intervals, as actually shown in FIGURE 6b.

In FIGURE 6d it can be shown that the scale interval B—B' contains ten equally spaced pointed positions. When the effect of the final separation is computed by the above formula it is found to be 1, which added to the nine pointer positions shown makes the ten.

Principle 4 states that the boundary points of a scale rather than unit points, as these are defined earlier, are assigned to the pointer positions of coincidence of edges. This principle is different from the customary practice of having the coincidence of the whole pointer with whole scale marks indicate unit points. Principle 1 replaced the coincidence of pointer and scale marks as a whole by the coincidence of edges. Principle 4 now replaces the assignment of unit points to the respective coincidences by the assignment of boundary points to these coincidences.

Figure 7:
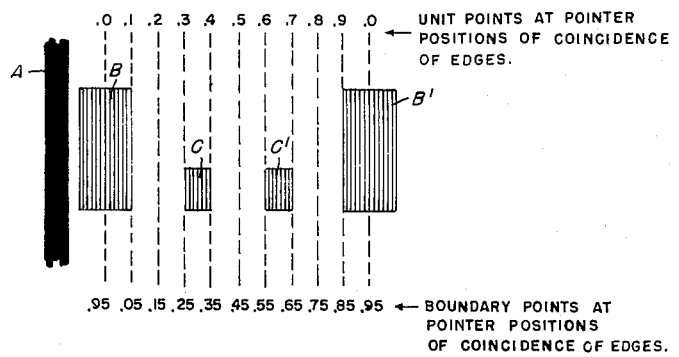
FIGURE 7 is a view of a scale interval similar to those in FIG. 2 but enlarged thirty times to illustrate principle 4.

To illustrate, in the customary pointer and scale arrangement in FIGURE 1 the unit points representing 20.0, 21.0, 22.0, etc., are found on the scale at those pointer positions at which the pointer coincides with the respective scale marks. Furthermore, if nine fine lines were put into each scale interval in FIGURE 1, the unit points representing, for example 21.1, 21.2, 21.3, etc., would be found on the scale at those pointer positions at which the pointer coincided with the respective fine lines within the interval. If unit points were assigned, in the particular embodiment of my invention shown in FIGURES 2 and 3, to pointer positions at the coincidence of edges, the unit points would be located as indicated by the broken lines and decimals at the top of FIGURE 7. When, on the other hand, boundary points are assigned to pointer positions of coincidence of edges these boundary points are located as indicated by the broken lines and decimals at the bottom of FIGURE 7. The effect of the use of principle 4 in this embodiment is to shift all scale values one-half fractional interval to the right of the values that would be assigned in the customary manner. In other embodiments other shifts of values may be used in the application of principle 4.

The assignment of boundary points to the pointer positions of coincidence of edges provides two advantages. These advantages derive from the fact that the boundary point is unique in the fractional interval because it is the point at which the correct reading of the smallest fractional unit changes. For example, when a pointer is anywhere between .05 and .15 on a scale read to one decimal, the correct final decimal is .1, but as the pointer passes the boundary point .15, moving rightward, the correct final decimal changes from .1 to .2. By designing the pointer and scale arrangement according to principles 1, 2, and 3, the critical features of the pointer and scale configuration shown in FIGURE 3 change precisely at the pointer positions of coincidence of edges. Therefore, by assigning the boundary points to match the pointer positions of coincidence of edges the two following advantages are achieved. First, the critical features remain constant over the fractional interval in which the correct reading remains constant. Thus the critical features given in FIGURE 3 can be used to identify the correct reading of the final decimals. Second, the precision of reading at the pointer positions of coincidence of edges is used to determine precisely which of two alternative pointer and scale configurations stand on the arrangement.

FIGURES 8, 9 and 10 are views of various alternatives embodying this invention. In FIGURE 8, the pointer A is one fractional interval wide, the interval marks B and B' are each one fractional interval wide and the sub marks C and C' are each two fractional intervals wide. The separation between the sub marks and the interval marks is two fractional units wide. This configuration is arrived at by using principle 2 and principle 3, thereby providing ten pointer positions or ten sub intervals.

In FIGURE 9, the pointer A is two fractional units wide, the interval marks B and B' are each one fractional interval wide. The sub mark C consists of a central shaft which is one fractional unit wide and steps on each side of said central shaft touching same and each being one fractional interval wide. The separations between the interval marks and the sub mark are three fractional units each. The same set of ten pointer positions and sub-intervals can be followed through in this arrangement as in the embodiment shown in FIGURE 8. The stepping arrangement of the sub mark C in FIGURE 9 enables the scale operator to more readily ascertain the points of coincidence within the sub mark. The contrast between the size of the steps and the size of the central shaft of sub mark C marks the point at which the steps and shaft meet and, therefore, the points of coincidence are readily discernable. The implications of the pointer, mark width ratio are set forth in the discussion of principle 2.

In FIGURE 10, the pointer A is one fractional unit wide, the interval marks B and B' and sub mark C are two fractional units wide. This configuration provides ten pointer positions also, as can be more readily seen in the discussion of principle 2 and principle 3.

FIGURES 11 through 15 are further modifications embodying this invention.

Referring to FIGURES 11 and 12, the scale marks 51 and 52 are divided into two tines 37 and 39 and 37' and 39', respectively. The distance or scale interval between the centers of marks 51 and 52 is designated as 20 in FIGURE 12. The interval 20 represents one-tenth of a larger interval partially shown. Tines 37 and 39 have a width of $\frac{1}{20}$ of the interval 20. The distance 41 between the tines 37 and 39 is $\frac{7}{20}$ of interval 20, which makes the distance 43 $\frac{9}{20}$ of the interval 20. The distance 45 then, between the midpoints of 37 and 39, would be $\frac{8}{20}$ of interval 20.

The mark 52, as all the marks on the scale, has two tines with exactly the same dimensions and spatial distances shown for mark 51. For this reason, the structure and distances are marked the same on 52 with the addition of "primes."

When the above distances and widths are given to the marks and their tines, it can be seen that the distance between adjacent tines of adjacent marks is $\frac{11}{20}$ of the interval between marks; for example, distance 47 between tines 39 and 37' is $\frac{11}{20}$ of the interval 20.

The pointer 60 consists of a stem 61 of any convenient width and three tines 63, 65 and 62. The width of each of these tines is $\frac{1}{20}$ of the interval 20. The distances 68 and 69 between tines is $\frac{3}{20}$ of the interval 20. This in turn makes the distance 71 between midpoints of the tines $\frac{4}{20}$ of the said interval. The overall width 73 of the pointer is then $\frac{9}{20}$ of the interval 20.

The pointer is adapted to move laterally with respect to the scale 31 in any conventional manner. Of course, in some equipment, particularly those which have a scale on a cylindrical drum, the scale moves with respect to the pointer; this is of no consequence in the present invention. In FIGURES 11 and 12, the pointer gives a reading of somewhere between 51 and 52; by using the scale of FIGURES 11 and 12, it will be shown below that it can be determined that the reading is approximately 51.60, accurate to the nearest tenth.

The above-identified widths and separations permit an operator to recognize and distinguish, without interpolation, 10 unique fractional intervals, each fractional interval being $\frac{1}{10}$ of the interval 20. The boundaries of the fractional intervals are sharply indicated by the fact that they are those points at which edges of the tines of the pointer come in contact with edges of the tines of the scale marks. If the tines are in contact, the pointer is on one side of a boundary point; if the tines are separated the pointer is on the other side of the boundary point. Readings are as precise as the operator's ability to distinguish contact from separation; as precise therefore, as his visual acuity.

The specific fractional interval at which the pointer is located is recognized by the features shown in Table I and in FIGURE 13. In this table, there are also shown the correct unit point readings to $\frac{1}{10}$ interval and the precise boundary points between which the readings are correct. The operator is not concerned with the boundary points in his work, but only with the correct reading. These correct readings are determined by the operator from the contacts or lack of contacts, as shown in FIGURE 13 and Table I. For example, now referring to FIGURE 12, for any position of the pointer in its progress from 51.45 to 51.55 the tines of the pointer will be between the marks 51 and 52, and no contacts of tines will occur. At the point of contact of the right tine 62 of the pointer, with the left tine 37' of the mark, the pointer passes from fractional interval 51.5, beyond the boundary point 51.55 into fractional interval 51.6. Further, for any position of the pointer in its progress from 51.55 to 51.65 the right pointer tine 62 will be in contact with the left mark tine 37' and the correct reading at any of the points will be 51.6. Again when the separation between the right pointer tine 62 and the left mark tine 37' occurs the correct reading to the nearest $\frac{1}{10}$ becomes 51.7.

*Table I*

| Sub-interval Boundary Points | Correct reading to $\frac{1}{10}$ interval | Recognizable Feature in this Particular Embodiment Figures 11 and 12 |
|---|---|---|
| .95–.05 | .0 | Outer tines in contact, 63 with 37; 62 with 39. |
| .05–.15 | .1 | Pointer tines 65 and 62 straddle but do not touch right mark tine 39. |
| .15–.25 | .2 | Center pointer tine 65 in contact with right mark tine 39. |
| .25–.35 | .3 | Pointer tines 63 and 65 straddle but do not touch right mark tine 39. |
| .35–.45 | .4 | Left pointer tine, 63 in contact with right mark tine 39. |
| .45–.55 | .5 | All pointer tines, 63, 65 and 62, in interval 47 with no contacts. |
| .55–.65 | .6 | Right pointer tine 62 in contact with left mark tine 37 or 37'. |
| .65–.75 | .7 | Pointer tines 65 and 62 straddle but do not touch mark tines 37 or 37'. |
| .75–.85 | .8 | Middle pointer tine 65 in contact with mark tines 37 or 37'. |
| .85–.95 | .9 | Pointer tines, 63, and 65 straddle but do not touch mark tines 37 or 37'. |

Referring now to the schematic representations shown in FIGURE 13, this figure represents a chart available to the operator until he has the positions memorized. The chart 100 shows a series of positions the pointer tines might have with relation to the scale mark tines. As can readily be seen by the first representation, if the outside tines are in contact the pointer or indicator is directly under the scale mark and the reading is .0 on the scale mark; if the right-hand tine of the scale mark and the middle tine of the pointer are in contact, the reading is .2 past that scale mark. It should be noted here that when tines are in contact, an even tenth is read. On the right-hand side of the chart is shown the graphical representations for the odd tenths. When the pointer tines fall between the mark tines, an odd tenth is read. For fast readings, the chart of FIGURE 13 is readily memorized and after several operations, an operator need not refer to such a chart.

An anlysis of one reading will show how the invention obtains its accuracy. Referring again to FIGURE 12, it can be seen seen that scale mark tine 37' and pointer tine 62 are in contact; now referring to the chart of FIGURE 13, it can be seen that such a reading should be 51.6. As proof of this, from a simple addition of fractions, the distance 90 between the center 70 of middle tine 65 and the center of make 52 is .4. The distance 90 is the sum of one-half the distance 73 [½ (9/20)] and the distance 42 which is one-half the distance 41' [½ (7/20)] which equals .4. This substracted from 52 will give a reading of exactly 51.6. Any of the representations shown in FIGURE 13 can be proven in a like manner. When the pointed moves 1/20 or .05 of the scale interval, to the right the left edge of 62 will just begin to separate from the right edge of 37'. Likewise, when the pointer moves 1/20 or .05 of the scale interval to the left, the right edge of 62 will just begin to separate from the left edge of 37'. Thus, the fractional interval boundary points .55 and .65 are shown to be precisely indicated by the separation versus contact of tines 62 and 37', and thus contact of tines 62 and 37' is a precise feature indicating the correct reading to 1/10 scale interval of 51.6. Other representations can be demonstrated in a similar manner.

The embodiment described above may have only two tines on the pointer or indicator and three tines on the scale itself. The width and distance relationships stay the same, of course, and the operation of the device would be the same except for obvious reversals.

FIGURE 14 is a further embodiment of the invention showing a scale of a pyramidal design rather than a plurality of tines. Again, the operation of the scale would be generally the same as that of FIGURE 11.

Each of the scale marks 51' conmprises three tines, two comparatively long tines 56 and 55 and a short middle tine 54; the width of each tine is 1/20 of the scale interval 20, and the distance 57 is 7/20 of the interval, which gives an over-all width to each of the scale marks of 9/20 of the interval 20. This is the same as width 43 of the embodiment shown in FIGURE 11.

The pointer 60 also has an over-all width of 9/20. The width of steps 61, 62, 64 and 65 is each 2/20 of the scale interval and the step 63 is 1/20.

The functioning of this scale is like that of FIGURE 12 and is accurate for the same reasons. Referring to FIGURE 15, the mark is in a position so that right edge 67 of the tine 55 is coincident with edge 79 of the top step 63 of the pointer. The reading in this position would be precisely 51.25, the boundary point between 51.2 and 51.3, because the distance 72 would be the sum of ½ the total distance of width 80 [½ × 9/20] plus ½ the width of tine 63 [½ × 1/20], the sum of which would be .25. If the pointer moves 1/10 scale interval to the right, the edge 67 of tine 55 will just begin to separate from step 62, thus indicating the boundary point at 51.35. Any position between these two boundary points will give a correct reading of 51.3 to the nearest 1/10 scale interval.

A graphical scale such as that shown in FIGURE 13 for the embodiment of FIGURE 11 can readily be developed for the scale using the pyramidal structure. In some instances, the scales of FIGURES 14 and 15 have been easier for operators to read than the previous embodiments.

By using the inventiveness of the above disclosed scale and pointer arrangements, other embodiments having other numbers of tines, relationships between tines, widths of tines, and distance between tines are available. The invention is not limited by the particular relationships and number of tines as disclosed.

In a general manner, while there has been disclosed in the above description, what is deemed to be the most practical and efficient embodiments of the invention, it should be well understood that the invention is not limited to such embodiments as there might be changes made in the arrangement, disposition and number of the parts without departing from the principle of the present invention as comprehended within the scope of the accompanying claims.

I claim:

1. A measurement device of a type having a scale and a pointer movable relative therealong comprising a plurality of spaced marks of equal width along said scale and each adjacent two of said marks defining an interval therebetween, one or more sub-marks in each of said intervals, the separations between said marks and sub-marks and between adjacent sub-marks, if there are two or more of them, being called sub-intervals for convenience, a single pointer movable along said scale, the width of said marks and sub-marks having a first equal width, said pointer being double that of said first width, said sub-intervals being four times that of said first width, and the interval width is a whole number multiple of said first width.

2. The device described in claim 1 wherein all of said widths are equal except for said interval width.

3. The device described in claim 1 wherein there is one sub-mark.

4. The device described in claim 1 wherein there are two sub-marks.

5. A measurement device of a type having a scale and a pointer movable relative therealong comprising a plurality of spaced marks of equal width along said scale and each adjacent two of said marks defining an interval therebetween, one or more sub-marks in each of said intervals and defining a plurality of separations with said marks, a pointer movable along said scale, the width of said pointer, said marks, said sub-marks, said intervals, and said separations being a whole number multiple of at least one of said widths, pointer positions of any whole number within said intervals, said pointer positions defined by the coincidence of at least one edge of said pointer with one edge of one of said marks or sub-marks, said pointer positions defining intervals of constant and equal widths along the scale, or defining intervals of some multiple of said constant and equal widths.

6. In a device for accurately determining the relative position of a pointer between interval markers on a scale, the combination comprising, a scale, a plurality of equally spaced interval markers on said scale, two tines extending from each of said markers, each tine having a width of 1/20 of the distance between the centers of said interval markers and having a distance between the centers of each of said tines of 9/20 of said distance, a pointer, three equally spaced pointer tines extending from said pointer, each of said pointer tines having a width equal to the widths of said two tines, said pointer tines having an overall width of 9/20 of said distance whereby the various relationships between the tines of the pointer and the tines of the markers will determine with accuracy the position of the pointer with respect to the scale.

7. A measurement device of a type having a scale and a pointer movable relative therealong comprising a plurality of spaced marks of equal width along said scale and each two of said marks defining an interval therebetween, one or more sub-marks in each of said intervals and defining a plurality of sub-intervals with said marks, a pointer movable along said scale, the width of said pointer, said marks, said sub-marks, said intervals, and said sub-intervals being a whole number multiple of at least one of said widths, said pointer and sub-marks having a first equal width and the widths of said sub-intervals and said marks being equal and double that of said first width.

8. A measurement device of a type having a scale and a pointer movable relative therealong comprising a plurality of spaced marks of equal width along said scale and each two of said marks defining an interival therebetween, one or more sub-marks in each of said intervals and defining a plurality of sub-intervals with said marks, a pointer movable along said scale, the width of said pointer, said marks, said sub-marks, said intervals, and said sub-intervals being a whole number multiple of at least one of said widths, there being one sub-mark, said sub-mark and said marks having widths equal and double the width of said pointer and said sub-intervals having widths triple that of said pointer.

9. In a measuring device of a type having a scale and a pointer movable relative therealong comprising a plurality of equally spaced marks along said scale and each adjacent two of said marks defining an interval therebetween, one or more sub-marks in each of said intervals the separation between said marks and sub-marks and between adjacent sub-marks, if there are two or more of them, being called sub-intervals for convenience, a pointer movable along said scale, boundary points being indicated by obvious coincidences of said pointer or some part of said pointer with said marks or said sub-marks or parts of said marks or said sub-marks.

References Cited by the Examiner
UNITED STATES PATENTS

| | | | |
|---|---|---|---|
| 940,007 | 11/09 | Granberry | 33—74 |
| 2,788,765 | 4/57 | Haynes | 116—136.5 |
| 2,797,614 | 7/57 | Heidenbain | 88—24 |

FOREIGN PATENTS 780,525   8/57   Great Britain.

ISAAC LISANN, *Primary Examiner.*